US008678450B2

(12) United States Patent
Seraphinoff

(10) Patent No.: US 8,678,450 B2
(45) Date of Patent: Mar. 25, 2014

(54) RAIL DRIVE DUCT CONNECTION SYSTEM

(76) Inventor: David Seraphinoff, South Lyon, MI (US)

( * ) Notice: Subject to any disclaimer, the term of this patent is extended or adjusted under 35 U.S.C. 154(b) by 609 days.

(21) Appl. No.: 12/701,016

(22) Filed: Feb. 5, 2010

(65) Prior Publication Data

US 2011/0194894 A1 Aug. 11, 2011

(51) Int. Cl.
*F16L 35/00* (2006.01)
(52) U.S. Cl.
USPC .......................................... 285/424; 285/364
(58) Field of Classification Search
USPC .............. 285/124.5, 133.6, 148.24, 188, 424, 285/364, 365, 366, 367
See application file for complete search history.

(56) References Cited

U.S. PATENT DOCUMENTS

| 2,627,430 A * | 2/1953 | Koffler ........................ 285/424 |
| 3,460,859 A | 8/1969 | Keating |
| 3,630,549 A | 12/1971 | Grimm |
| 3,940,900 A * | 3/1976 | Russo ......................... 52/656.1 |
| 4,288,115 A * | 9/1981 | Sullivan ....................... 285/363 |
| 4,447,079 A | 5/1984 | Sullivan |
| 4,461,499 A | 7/1984 | Hunter et al. |
| 4,564,227 A | 1/1986 | Murck |
| 4,566,724 A | 1/1986 | Arnoldt et al. |
| 4,995,648 A | 2/1991 | Jackson |
| 5,005,879 A | 4/1991 | Jackson |
| 5,015,018 A * | 5/1991 | Arnoldt ........................ 285/424 |
| 5,275,449 A | 1/1994 | Hunter |
| 5,673,947 A | 10/1997 | De Waal |

FOREIGN PATENT DOCUMENTS

| DE | 24 14 815 | 10/1975 |
| DE | 27 00 681 | 6/1978 |
| EP | 0 036 038 | 9/1981 |
| EP | 1 191 267 | 5/2005 |

* cited by examiner

*Primary Examiner* — David E Bochna
(74) *Attorney, Agent, or Firm* — Harness, Dickey & Pierce, P.L.C.

(57) ABSTRACT

An apparatus for joining high pressure ducts has a first and second bar secured to adjacent to be joined ducts. A coupling mechanism having a U-shape is frictionally engaged onto the first and second bar. An end of the coupling mechanism frictionally engages the surface of the bar members so that the coupling mechanism is slidably removably connected to the first and second bars.

13 Claims, 4 Drawing Sheets

RAIL DRIVE DUCT CONNECTION SYSTEM

FIELD

The present disclosure relates to high pressure duct work and, more particularly, to an apparatus for joining adjacent ducts.

BACKGROUND

High pressure duct work is utilized in numerous environments. Generally, the duct work is hung from the building. The duct work has a large diametrical size and requires joining of adjacent portions of duct work. In order to join the duct work portions, precision alignment is required. Adjacent ducts include flanges with a plurality of holes. The holes are aligned with one another. Next, rings are positioned along side the flanges to provide reinforcement and additional clamping surface. The rings include a plurality of holes to align with the holes of the flanges. A plurality of bolts is passed through the rings and flanges to secure the duct portions with one another.

This process of connecting adjoining duct work portions, while satisfactorily sealing the two ducts portions with one another, is very time consuming and labor intensive. It requires exact positioning of the duct work portions as well as the reinforcing rings. Thus, it is desirable to have an apparatus for joining high pressure ducts that reduce the time to join the duct portions together as well as lessening the time it takes to connect them together.

SUMMARY

Accordingly, it is an object of the present disclosure to provide an apparatus to join high pressure duct portions that is not labor intensive. The present disclosure provides an apparatus that reduces the time to join adjacent duct portions. The present apparatus enables connecting members to slidably frictionally engage the duct work portions. The apparatus enables the connection to be easily releasable.

According to the present disclosure, an apparatus for joining high pressure ducts comprises a first bar adapted to be fixed with the first duct. The first bar includes a first member with a surface to secure with the first duct. The second member extends from the first member. The second member has a surface to secure with a coupling mechanism. A second bar is adapted to be fixed with a second duct. The second bar includes a first member with a surface to secure with the second duct. A second member extends from the first member. The second member has a surface to secure with the coupling mechanism. The coupling mechanism has an overall U-shape with legs that oppose one another and include turned up ends. The turned up ends mate with the surfaces of the second member of the first and second bars. The turned up ends frictionally engage the surface of the second members so that the coupling mechanism is slidably removably connected with the first and second bars. A sealing gasket is positioned between the first and second bars. The first and second bars and coupling mechanism corresponds to a number of sides of the to be connected ducts. A plurality of corner connectors prohibit the coupling mechanism from traveling beyond the first and second bars. A second coupling mechanism is coupled with the first coupling mechanism, in an inverted position, so that webs of the U are back to back. The second coupling mechanism receives the connectors.

In accordance with a second aspect of the disclosure, an apparatus to join high pressure ducts comprises a plurality of first bar members. The plurality corresponds to the number of sides of the to be joined ducts. Each first bar member include a first member having a surface to secure with a first duct. A second member extends from the first member. The second member has a surface to secure with a coupling mechanism. A plurality of second bar members corresponds to the number of the first bar members. Each second bar member includes a first member having a surface to secure with the second duct. A second member extends from the first member. The second member has a surface to secure with the coupling mechanism. A plurality of coupling mechanisms couple the plurality of first and second bar members together. Each coupling mechanism has an overall U-shape with the legs that oppose one another. The legs include turned in ends to mate with the surface of the second members of the first and second bar members. The turned in ends frictionally engage the surfaces of the second members so that the coupling mechanism slidably removably connected with the first and second bar members. A plurality of connectors prohibit overextending of adjacent ends of the first bar and second bar members. The apparatus is substantially continuous about the to be joined ducts. Each coupling mechanism includes a second coupling mechanism coupled with the first coupling mechanism. The second coupling mechanism is in an inverted position so that webs of the Us are back to back. Connectors are coupled with the second coupling mechanism.

According to a third aspect of the disclosure, a method to join high pressure ducts comprises positioning a pair of ducts to be joined together adjacent one another. The ducts have a configuration with a plurality of sides. A plurality of first bar members and second bars members are provided. The number of the pluralities correspond to the number of sides of the ducts. The first bar members are permanently affixed to one of the ducts. The second bar members are permanently affixed to the other duct. The first and second bar members are coupled with one another with a coupling mechanism. The coupling mechanism is slid onto the first and second bar members such that ends of the coupling mechanism mate with surfaces of the second member of the first and second bar members to join the ducts together. The first and second bar members are welded to the ducts. Connectors prohibit overextension of adjacent first bar and second bar members at their ends. A seal is positioned between the first and second bar members. The coupling mechanisms are removably slidably connected with the first and second bar members.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Figure 1:
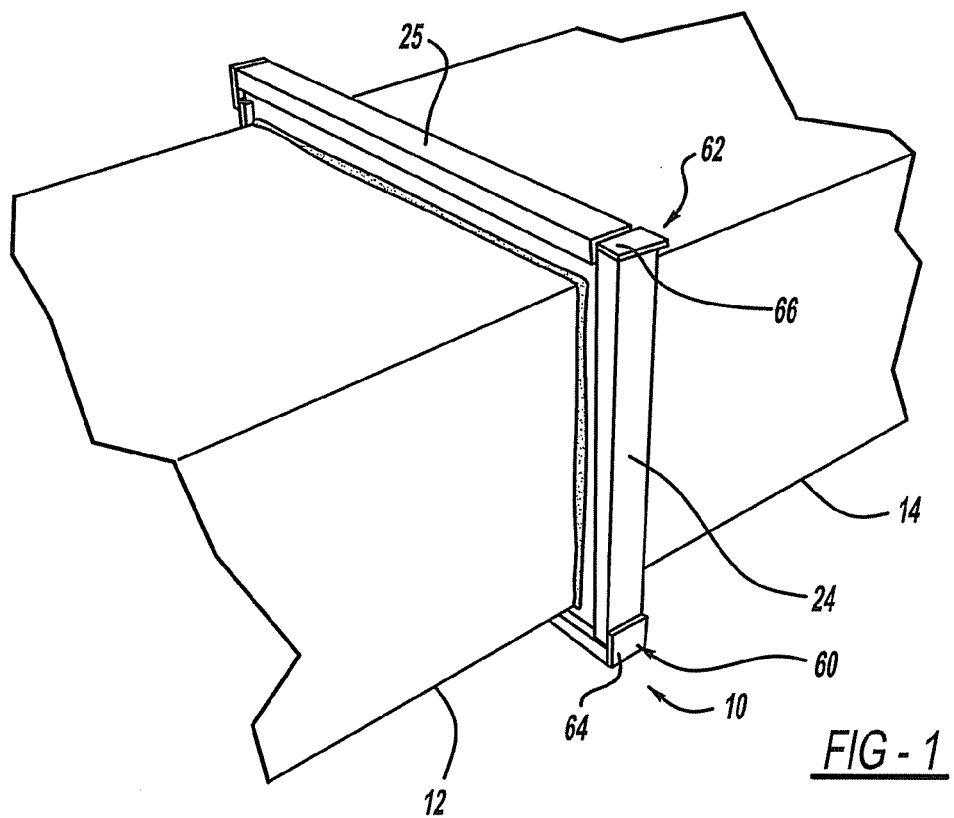
FIG. 1 is a perspective view of a joint connection in accordance with present disclosure.

Example embodiments will now be described more fully with reference to the accompanying drawings.

Turning to figures, an apparatus to join adjacent ducts 12 and 14 is illustrated and designated with the reference numeral 10. The ducts 12, 14 are substantially identical and have a desired polygonal cross-section. They are illustrated with a rectangular cross-section in FIG. 1. The ducts 12, 14 include ends 16, 18, respectively. The ends 16, 18 define a perimeter of the ducts 12, 14. Thus, the end 16, 18 provide a peripheral connection for the apparatus 10 as described herein.

The apparatus 10 to join the ducts 12, 14 includes a plurality of first bars, each designated with the reference numeral 20, a plurality of second bars, each designated with the reference numeral 22, and a plurality of connecting mechanisms, each designated with the reference numeral 24. The first and second bars 20 and 22 are substantially identical and will be explained referring to a single bar.

Figure 3:
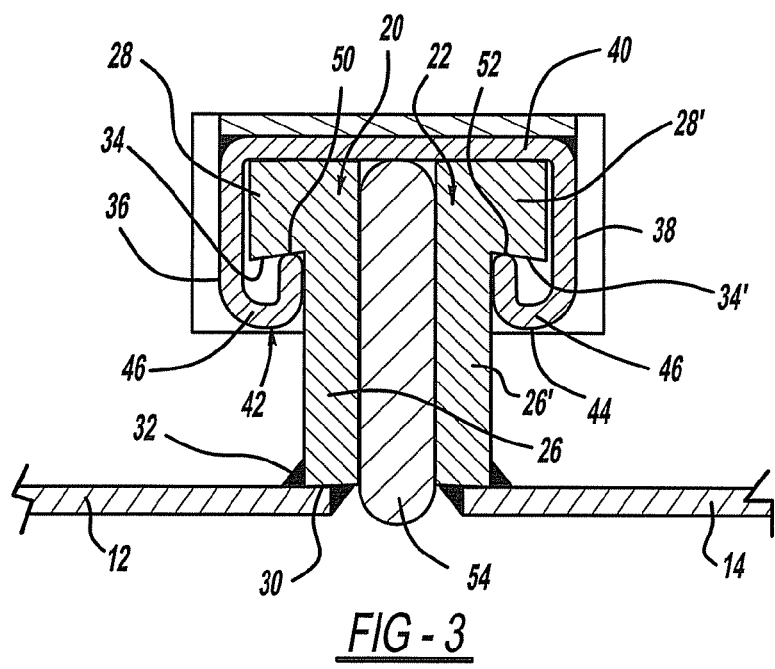
FIG. 3 is a cross-section view taken along line 3-3 of FIG. 1.

The bar 20 includes a first member 26 and a second member 28. Both members are elongated and both have an overall rectangular cross-section as illustrated in FIG. 3. The second member 28 extends from the first member 26. The second member 28 may be welded to or integrally or unitarily formed with the first member 26. Preferably, the bars 20 are one piece cold drawn steel. The first and second members 26, 28 give the bar 20 an overall L-shaped configuration when viewed in cross-section in FIG. 3. The first member 26 includes a surface 30 that is positioned on or adjacent to the end 16 of the duct 12. A weld 32 secures the first member 26 with the duct 12. The weld 32 is preferably continuous along the first member 26. The second member 28 includes a surface 34 that secures with the coupling mechanism 24 as will be discussed later. The surface 34 is angled upward from horizontal at about 1°

The second plurality of bars 22 has the same configuration as that of the first plurality of bars 20. Thus, corresponding elements are identified with the same reference numerals including a prime.

Figure 2:
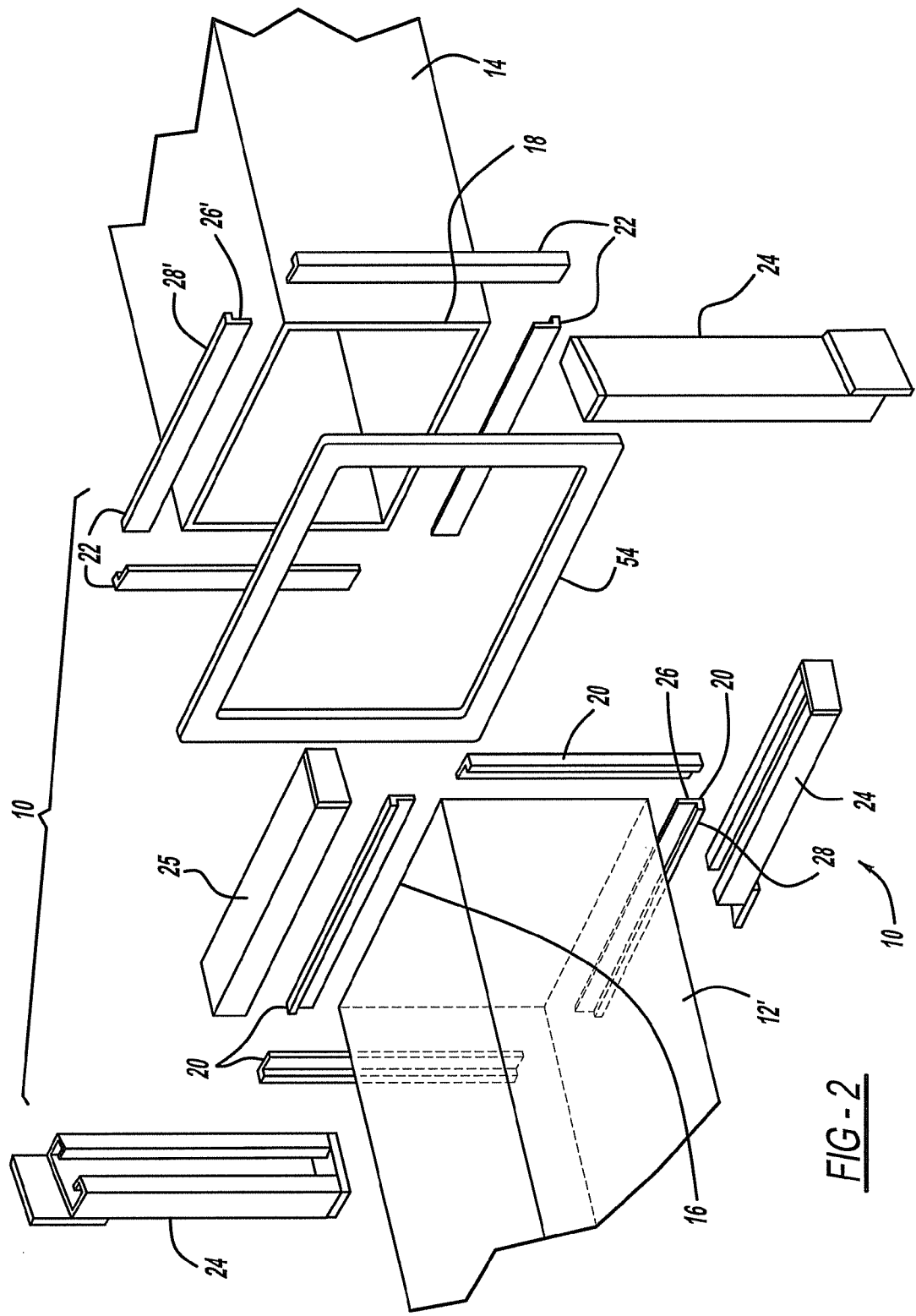
FIG. 2 is an exploded perspective view of FIG. 1.

The coupling mechanisms 24, 25 have an overall U-shape in cross-section. The coupling mechanisms 24, 25 each include legs 36, 38 joined by a web 40. The coupling mechanisms 24, 25 have an overall elongated rectangular shape as seen in FIG. 2. The coupling mechanism 24, 25 are manufactured from metal and may be Unistrut® members cut to size. The legs 36, 38 oppose one another. Each leg 36, 38 includes a turned in or up member 42, 44. The turned in members 42, 44 include a flange portion 46, 48 and an extending portion 50, 52. The flange portions 46, 48 extend from the legs 36, 38, respectively. The extending portions 50, 52 project towards the web 40 and are generally parallel to the legs 36, 38. The turned in portions 42, 44 are integrally or unitarily formed with the legs 36, 38, respectively. The end of the extending portions 50, 52 frictionally engage the surfaces 34, 34' of the bar members 20, 22, as illustrated in FIG. 3. Thus, the coupling mechanisms 24, 25 simultaneously frictionally engage both bar members 20, 22. The coupling mechanisms 24, 25 are removably slid onto the bar members 20, 22. The ends of the projecting portions 50, 52 of the upturned ends 42, 44 engage the surfaces 34, 34' of the bar members 20, 22. This engagement holds the coupling mechanisms 24. 25 together with the bar members 20, 22.

A seal 54 is positioned between the first members 26, 26' of the bars 20, 22. The seal 54 provides additional sealing to the duct work. The seal 54 generally has a ring shape corresponding to the duct configuration. Here, the seal 54 has a rectangular ring shape corresponding to the rectangular shape of the ducts.

Figure 4:
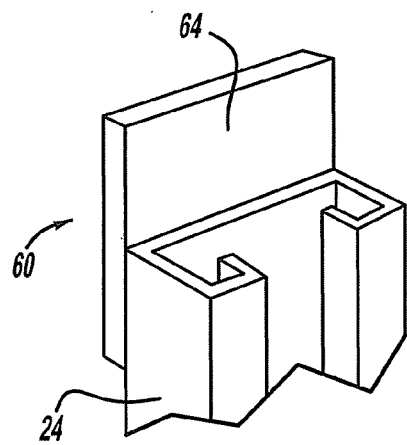
FIG. 4 is a perspective view of an end connection of the apparatus.
Figure 5:
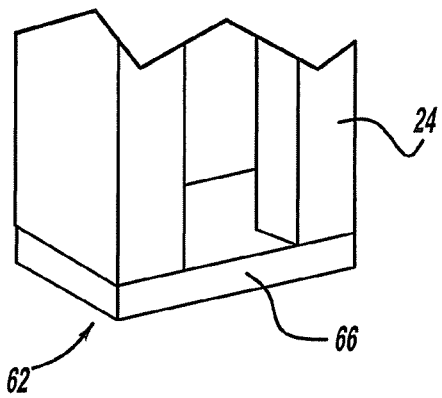
FIG. 5 is a perspective view of the end connection.

Turning to FIGS. 4 and 5, the end connectors 60, 62 of the coupling mechanisms 24 are illustrated. In the rectangular duct configuration shown. Three of the coupling mechanisms 24 include the end connectors 60, 62. The other coupling mechanisms 25 has one opened end and one covered end like connector 62. The coupling mechanisms 24 include a first end connector 60 and a second end connector 62. The first end connector 60 includes a tab 64 that projects from one end of the coupling mechanism 24. The tab 64 abuts against an end of the adjoining coupling mechanism 25. The tab 64 prohibits further overextending movement of the adjoining coupling mechanism 24 as illustrated in FIG. 1. Thus, the adjoining coupling mechanism 25 cannot extend beyond the adjoining coupling mechanism 24.

The second end 62 includes a plate 66. The plate 66 is positioned perpendicular to the coupling mechanism 24. The plate 66 cuts off or terminates the U-shaped opening of the coupling mechanism 24. The plate 66 and adjoining coupling mechanism 25 are illustrated in FIG. 1. The plate 66 prohibits continued overextending movement of the adjoining coupling mechanism 25. The web 40 abuts the plate 66 prohibiting further movement of the adjoining coupling mechanism 25. Thus, the coupling mechanisms 24 with their ends 60, 62 provide a substantially continuous apparatus about the ducts 12, 14, as seen in FIG. 1.

Figure 6:
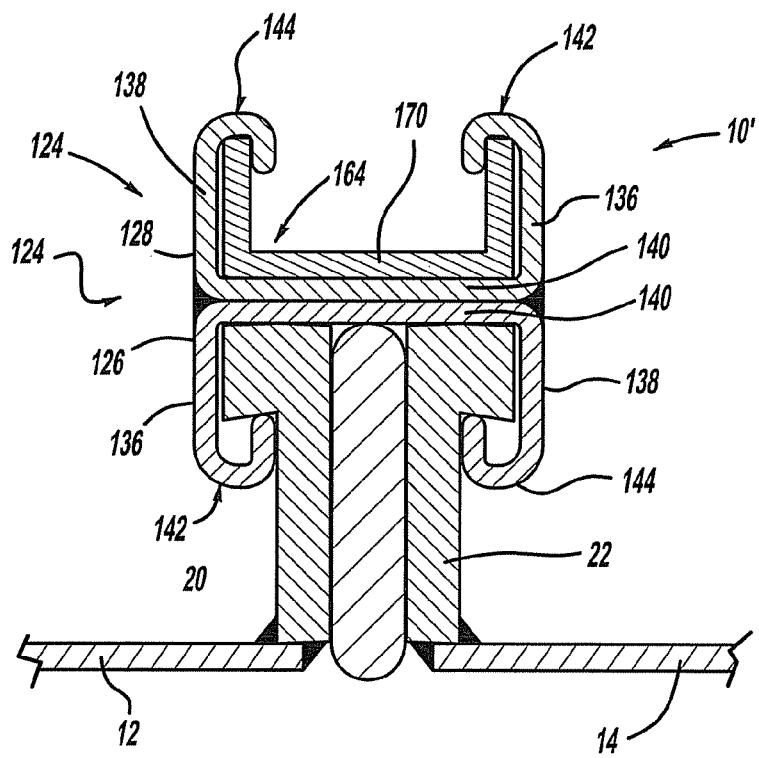
FIG. 6 is a cross-section view like FIG. 3 of an additional embodiment of the present disclosure.
Figure 7:
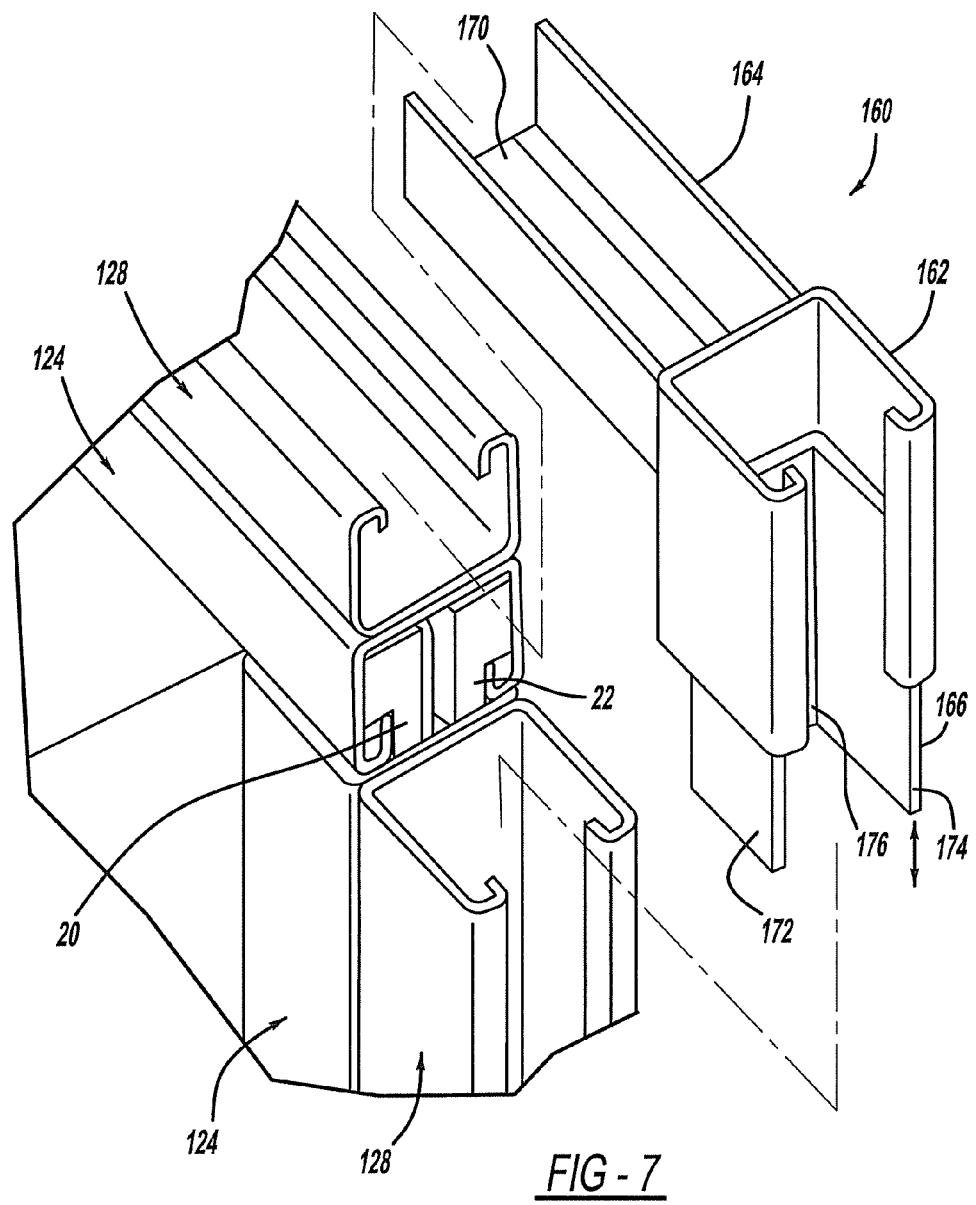
FIG. 7 is a partial perspective view of a connector mechanism for the apparatus of FIG. 6.

Turning to FIGS. 6 and 7, an additional embodiment is illustrated. In FIG. 6, a cross-section of the apparatus 10' is shown. The bar members 20, 22 are the same as previously described. Thus, the bar members 20, 22 are identified with the same reference numerals. The coupling mechanism 124 is different. The coupling mechanism 124 includes two U-shaped members 126, 128 like those described above. The U-shaped members 126, 128 are substantially identical to one another. The U-shaped members 126, 128 include legs 136, 138 and webs 140. The upturned members 142, 144 are like those previously described. The difference is that the two U-shaped members 126, 128 are positioned with the webs 140 back to back to one another so that one U-shape member 128 is inverted on the other U-shaped member 126. This type of connecting mechanism is utilized in high pressure applications.

A connector mechanism for connecting these coupling mechanisms 124 is illustrated in FIG. 7. Here the connector mechanism 160 has an overall L-shape. The connector mechanism 160 includes a housing 162, a fixed leg 164 and a movable leg 166. The housing 160 is U-shaped and has the same features as the coupling 24. The legs 164, 166 have an overall U-shape in cross-section to fit within the legs 136, 138 of the U-shape member 128 of the coupling mechanism 124. The leg 164 is fit into the U-shape member 128 with its web 170 riding along web 140 of the coupling mechanism 124. Movable leg 166 includes legs 172, 174 as well as web 176. The movable leg 166 is slidable in the U-shaped housing 162. The fixed leg 164 is slid into the U-shaped member 128. The movable leg portion 166 is moved up out of engagement with the adjacent coupling mechanism 124. The movable leg 166 is moved into the adjacent U-shaped member 128. Thus, the corner connection 160 is coupled with both adjacent coupling mechanism 124. This forms a continuous apparatus 10 about the duct work 12, 14.

A method for connecting ducts 12, 14 will be explained. The adjacent pair of ducts 12, 14 is joined together by providing a plurality of first 20 and second bar 22 members. The first 20 and second bar 22 members are welded onto the ducts 12, 14. The seal 54 may be positioned between the bar members 20, 22. The first 20 and second plurality 22 of bar members is permanently affixed by welding the surfaces 30, 30' onto the ducts 12, 14. The coupling mechanisms 24, 25 are frictionally engaged with the bar members 20, 22. The coupling mechanisms 24, 25 are slid onto the first and second bar members 20, 22. The upturned ends 42, 44 of the coupling mechanisms contact the surfaces 34, 34' of the second member 28, 28' of the first and second bar members 20, 22. This joins the ducts 12, 14 together. If coupling mechanism 124 is used, the connector mechanisms 160 join the adjacent coupling members 124 together. This forms a continuous apparatus 10' about the ducts 12, 14.

The description of the disclosure is merely exemplary in nature and thus, variations that do not depart from the gist of the disclosure are intended to be within the scope of the disclosure. Such variations are not to be regarded as a departure from the spirit and scope of the disclosure.

What is claimed is:

1. An apparatus for joining high pressure ducts by welding the apparatus to a pair of ducts comprising:
    a first bar welded to a first duct, said first bar including a first member having a surface for welding with the first duct, a second member extending from said first member, said second member having a surface for engaging with a coupling mechanism;
    a second bar welded with a second duct, said second bar including a first member having a surface for welding with the second duct, a second member extending from said first member, said second member having a surface for engaging with the coupling mechanism; and
    the coupling mechanism having an overall U-shape with legs, said legs opposing one another and including upturned ends for engaging said surface of said second members of said first and second bars, said upturned ends being substantially parallel to the legs and frictionally engaging said surfaces of said second members so that said coupling mechanism is removably connected with said first and second bars such that the coupling mechanism can only be slid onto or off of the first and second bars to couple the first and second bars together.

2. The apparatus of claim 1, further comprising a sealing gasket to be positioned between said first and second bars.

3. The apparatus of claim 1, wherein a plurality of first and second bar and coupling mechanisms correspond to a number of sides of the first and second duct.

4. The apparatus of claim 3, further comprising a plurality of corner connectors, each connector prohibiting overextending of adjacent first and second bars.

5. The apparatus of claim 1, wherein a second coupling mechanism is coupled with said first coupling mechanism in an inverted position.

6. The apparatus of claim 1, further comprising the first duct and the second duct weldably connected with the first and second bar members.

7. An apparatus for joining high pressure ducts by welding the apparatus to a pair of ducts comprising:
    a plurality of first bar members, said plurality corresponding to a number of sides of the to be joined ducts, each first bar member including a first member having a surface welded to a first duct, a second member extending from said first member, said second member having a surface for engaging with a coupling mechanism;
    a plurality of second bar members, said plurality corresponding to the number of first bar members, each second bar member including a first member having a surface welded to a second duct, a second member extending from said first member, said second member having a surface for engaging with the coupling mechanism;
    a plurality of coupling mechanisms, each coupling mechanism having an overall U-shape with legs opposing one another and including upturned ends for engaging said surface of the second members of said first and second bar members, said upturned ends being substantially parallel to the legs and frictionally engaging said surfaces of said second members so that said coupling mechanisms are removably connected with said first and second bars, the coupling mechanisms are only slidable onto and off of the first and second bars to couple the first and second bars together; and
    a plurality of end connectors, each end connector prohibiting overextending of adjacent ends of said first bar members and second bar members for providing a substantially continuous apparatus about the to be joined first and second ducts.

8. The apparatus of claim 7, further comprising a seal positioned between said plurality of adjacent first and second bar members.

9. The apparatus of claim 7, wherein each coupling mechanism includes a second coupling mechanism coupled with said first coupling mechanism in an inverted position.

10. The apparatus of claim 9, wherein said plurality of end connectors are coupled with said second coupling mechanisms.

11. The apparatus of claim 10, wherein each end connector includes a housing, a fixed leg and a movable leg.

12. The apparatus of claim 7, wherein said coupling mechanism is a bar member.

13. The apparatus of claim 7, further comprising the first duct and the second duct weldably connected with the first and second bar members.

* * * * *